E. A. SPERRY.
ROTOR FOR GYROSCOPIC STABILIZERS.
APPLICATION FILED DEC. 13, 1916.

1,318,302.

Patented Oct. 7, 1919.
3 SHEETS—SHEET 1.

INVENTOR.
ELMER A. SPERRY.
BY
Herbert H. Thompson
ATTORNEY.

E. A. SPERRY.
ROTOR FOR GYROSCOPIC STABILIZERS.
APPLICATION FILED DEC. 13, 1916.

1,318,302.

Patented Oct. 7, 1919.
3 SHEETS—SHEET 2.

INVENTOR
ELMER A. SPERRY.
BY
Herbert H. Thompson
ATTORNEY.

E. A. SPERRY.
ROTOR FOR GYROSCOPIC STABILIZERS.
APPLICATION FILED DEC. 13, 1916.
1,318,302.
Patented Oct. 7, 1919.
3 SHEETS—SHEET 3.
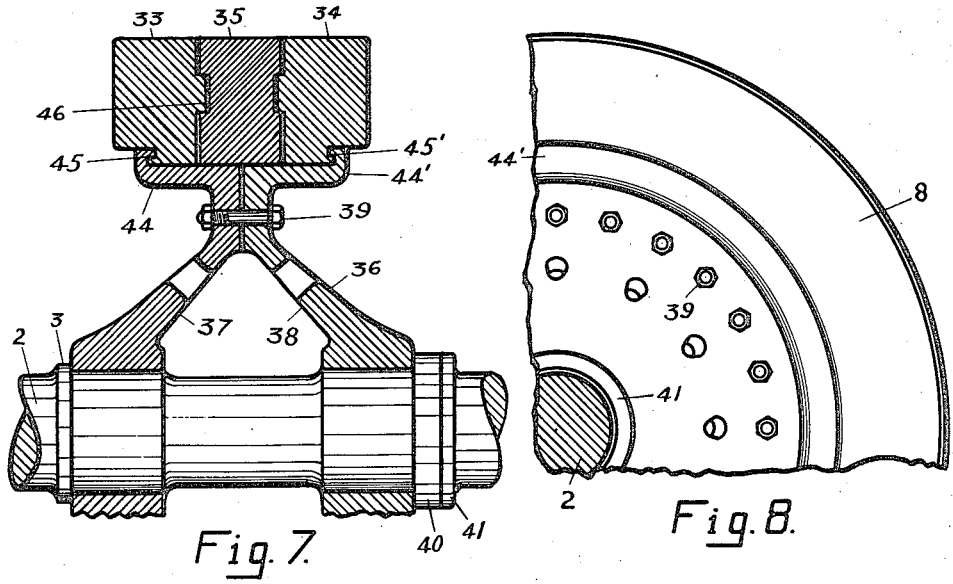
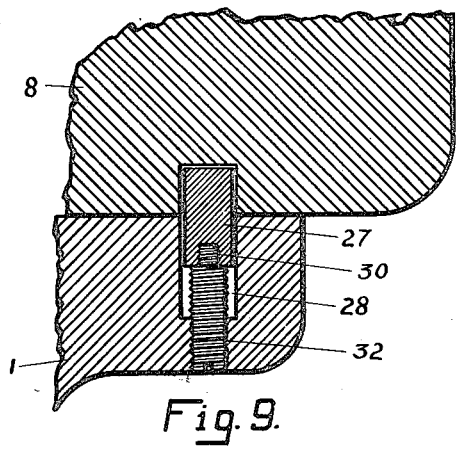
INVENTOR
ELMER A. SPERRY.
BY
Herbert H. Thompson
ATTORNEY.

UNITED STATES PATENT OFFICE.

ELMER A. SPERRY, OF BROOKLYN, NEW YORK, ASSIGNOR TO SPERRY GYROSCOPE COMPANY, OF BROOKLYN, NEW YORK, A CORPORATION OF NEW YORK.

ROTOR FOR GYROSCOPIC STABILIZERS.

1,318,302.      Specification of Letters Patent.    Patented Oct. 7, 1919.

Application filed December 13, 1916. Serial No. 136,617.

*To all whom it may concern:*

Be it known that I, ELMER A. SPERRY, a citizen of the United States of America, residing at 1505 Albermarle road, Brooklyn, in the county of Kings and State of New York, have invented certain new and useful Improvements in Rotors for Gyroscopic Stabilizers, of which the following is a specification.

This invention relates to a new and improved method of constructing fly wheels for use as rotors in gyroscopic stabilizers for ships. Owing to the enormous weight of the rotor it is impracticable to cast it in one piece or even to cast the rim alone in one piece, and owing to the intense and various stresses to which such a rotor is subject, it is impracticable to assemble the several parts in any of the numerous ways in which built up fly wheels are assembled.

Figure 1:
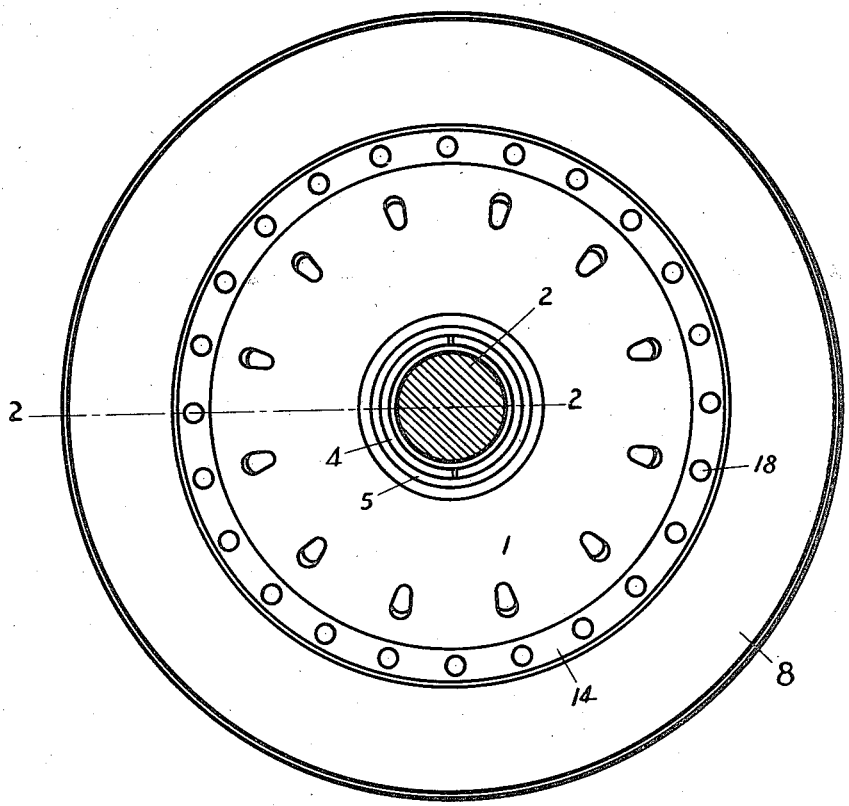
Figure 2:
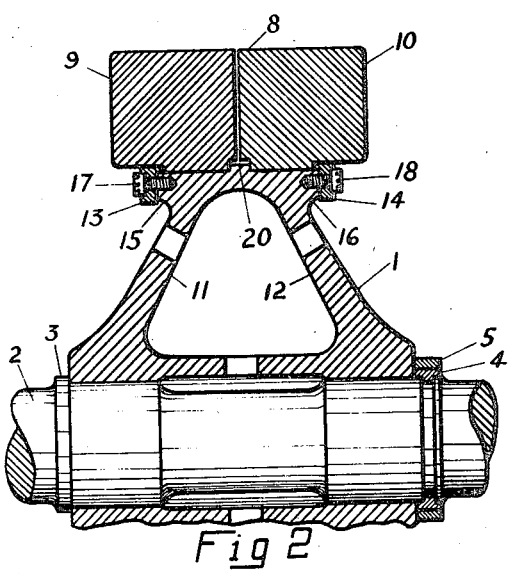
Figure 3:
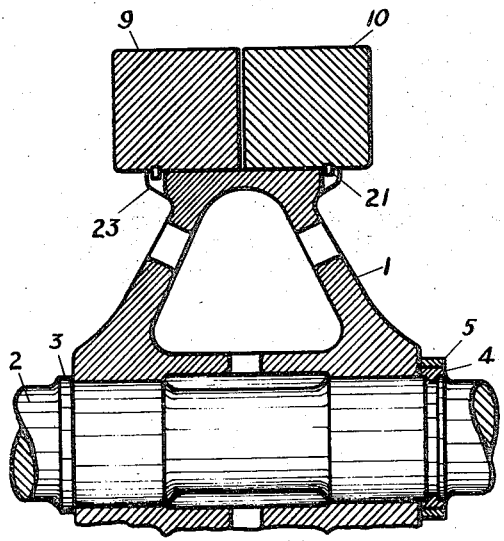
Figure 4:
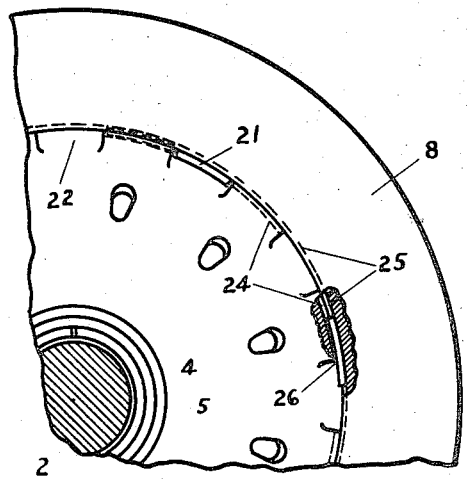
Figure 5:
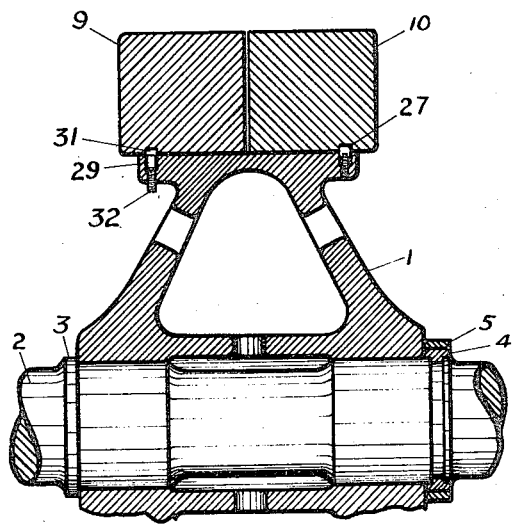
Figure 6:
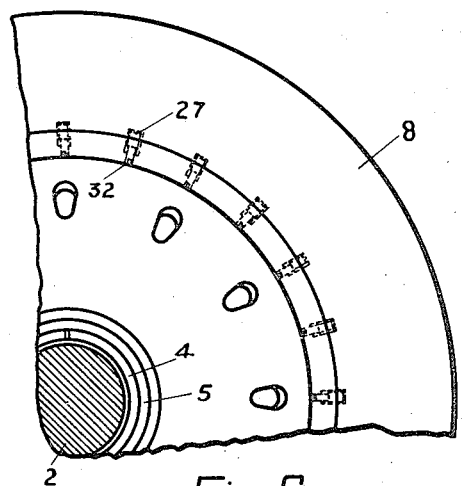

The object of this invention is to overcome these difficulties. The manner in which this is accomplished will be described and particularly pointed out in the appended specification and in the drawings, in which: Figure 1 is a side elevation, showing one form of the invention. Fig. 2 is a section of the same wheel, on line 2—2, Fig. 1, taken at right angles to the view shown in Fig. 1. Figs. 3 and 4 show a modified form of securing the rim to the spider or hub of the rotor. Figs. 5 and 6 show another modification in the method of securing the rim to the spider. Figs. 7 and 8 show a third modification in the manner of constructing the rotor, and Fig. 9 is a detail taken from Fig. 5.

In Figs. 1 and 2 the hub 1 is shown upon axle 2 and prevented from lateral movements thereon by shoulder 3 on one side and by rings 4 and 5 on the other. Ring 4 serves to prevent lateral movement of the hub, while ring 5 serves to hold 4 in place.

Rim 8 is shown as comprising two parts 9 and 10, each being a completely closed ring. When it is understood that the weight of the complete rim may be in the neighborhood of one hundred tons, the difficulties in casting will be readily appreciated, and the advantage of casting the rim in two or more sections becomes obvious. This advantage does not rest alone in the reduction in the size of the molds and the weight of the casting, but also, in the event of a flaw appearing in one of the castings only a part of the entire rim will have to be recast.

The manner in which the wheel is assembled is as follows: The hub is tightly fitted upon the axle and secured in place by rings 4 and 5 as previously explained. The rim members having an inner diameter slightly less than the outer diameter of the hub are heated sufficiently to cause an expansion which will permit them to be slipped onto the hub. The rim is then allowed to cool, compressing itself upon the hub, and also compressing the hub upon the axle so as to prevent slipping between said hub and axle. Also, the hub is so constructed that, besides the compression upon the axle, the sides 11 and 12 thereof are elastic and will yield to the compression of the cooled rim, so that when the rim again expands as the result of centrifugal force, while the wheel is rapidly rotating, the hub will follow it in its expansion, thus preventing the occurrence of a gap between said rim and hub. I prefer to compress the hub to a greater degree than it will subsequently be allowed to expand; the result being that the compression of the hub upon the axle will not be released sufficiently to allow slipping between said hub and axle.

In order to prevent the rim from slipping off from the hub as a result of the tremendous lateral stresses to which gyroscopic stabilizing rotors are subject, rings 13 and 14 are fastened to the flaring portions 15 and 16 of the hub by means of studs 17 and 18.

In order to prevent the pressure of the whole rim from bearing against either of the rings 13 and 14 when exerting precessional stresses, a flange 20 may be provided on the hub, to receive a part of said pressure by preventing either portion 9 or 10 of the rim from pressing against the other.

The preferred form of my invention is shown in Figs. 3 and 4, where, instead of rings 13 and 14 and studs 17 and 18, I employ keys 21 to hold the rim in place on the hub. The manner in which these keys are inserted is as follows: Recesses 22 are provided at intervals along the flaring portion 23 of the periphery of the hub. In the remaining part of the flaring portion 23 a key way 24 is provided. A corresponding key way 25 is provided on the inner surface of the rim extending all the way around. The key is placed in the recess, slipped into the keyway 25 and then forced through 25 into key way 24 as seen at 26 where portions of the rim and hub are cut away to show the key partly inserted.

In this form of the invention I do not show the flange 20 as in Fig. 2, for, as is plainly seen, the keys serve to hold the separate portions 9 and 10 of the rim in place against precessional forces in either direction.

The manner in which the rim is placed upon the hub is the same in this form of the invention as explained in connection with Figs. 1 and 2.

In Figs. 5 and 6 another modification is shown in the manner of holding the rim in place on the hub. Here I employ pins 27 (see Fig. 9) which lock said hub and rim together as shown. While the rim is being shrunk onto the hub, the pin is entirely within the hole 28 of the hub 1 as shown at 29. The pin may be held in this position by being tightly fitted into the hole, or by means of a screw which may be inserted into the threaded hole 30 of said pin. After the rim is in place, the pin may be forced into the hole 31 in the rim by means of screw 32. If at any time it should be desired to remove the pin, this may be accomplished by first removing screw 32, then inserting a long screw into the aforesaid threaded hole 30, and drawing down upon said screw.

In Figs. 7 and 8 I vary the form of my invention by providing three or more rings to form the rim of the wheel, and by using a split hub 36. The preferred method of assembling this wheel is as follows: The several parts of the rim are placed upon the hub in the cold state and the hub secured together by means of bolts 39. Nut 40 and lock nut 41 are tightened with sufficient force to impart an initial strain to the elastic sides 37 and 38 of the hub causing the hub to press tightly against the rim. When the rim spreads under centrifugal force it draws the flaring portions 44 and 44' of the hub with it by means of interlocking projections 45 and 45'. This causes a dishing of the hub and a resultant pressing together of the several parts of the rim which are in turn interlocked by means such as tongue and groove 46. It will thus be seen that I utilize the centrifugal force to hold the hub and rim more firmly together as one piece. This specific form of my invention is not claimed herein specifically however, but is reserved for my copending application for rotors for gyroscopes filed April 20th, 1917, Serial No. 163342.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:—

1. A fly-wheel comprising a hub and a plurality of heavy rims mounted thereon side by side and separately secured to said hub.

2. A fly-wheel comprising an elastic hub and a heavy rim comprising a plurality of separate rings shrunk thereon and placed side by side.

3. In a gyroscopic stabilizing rotor, an elastic hub portion, a plurality of heavy rings mounted thereon to form a rim, and means to prevent said rim from being moved laterally upon said hub by gyroscopic reaction.

4. In a fly-wheel, an elastic hub portion, a plurality of heavy rings shrunk thereon to form a rim, and securing means between the rim and hub to lock said rim to said hub.

5. In a fly-wheel, an axle, a rotor hub mounted thereon, a rim shrunk on said hub and compressing the hub upon the axle to a degree greater than the subsequent enlargement of the rim will release, thereby preventing the hub from becoming loose upon the axle.

6. In a gyroscopic rotor, an elastic hub and a rim shrunk thereon compressing said hub so that the hub will follow the enlargement of the rim.

7. In a gyroscopic rotor, a shaft, a resilient hub under compression and mounted on said shaft and a rim carried by said hub.

8. A gyroscopic rotor comprising a shaft, a hub and means for placing said hub under radial compression for securing said hub to said shaft.

9. In a gyroscopic rotor, a hub provided with a key-way extending in a circumferential direction, a rim portion on said hub provided with a complemental key-way and a key in said key-way.

In testimony whereof I have affixed my signature.

ELMER A. SPERRY.